United States Patent
Ohno et al.

(10) Patent No.: US 6,198,781 B1
(45) Date of Patent: Mar. 6, 2001

(54) APPARATUS AND METHOD OF DEMODULATING CODED SIGNAL UNDER OFDM TRANSMISSION

(75) Inventors: Katsumi Ohno; Kenji Sugiyama, both of Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/047,574

(22) Filed: Mar. 25, 1998

(30) Foreign Application Priority Data

Mar. 31, 1997 (JP) .................................................. 9-097981

(51) Int. Cl.[7] ............................ H04L 27/28; H04L 27/32
(52) U.S. Cl. ............................ 375/322; 375/260; 370/203
(58) Field of Search .................................... 375/322, 260, 375/203

(56) References Cited

U.S. PATENT DOCUMENTS

| | | | |
|---|---|---|---|
| 5,369,670 | * 11/1994 | Zagloul et al. | 375/330 |
| 5,717,722 | * 2/1998 | Mori | 375/326 |
| 5,748,677 | * 5/1998 | Kumar | 375/285 |
| 5,771,224 | * 6/1998 | Seki et al. | 370/206 |
| 5,774,450 | * 6/1998 | Harada et al. | 370/206 |
| 5,796,814 | * 8/1998 | Brajal et al. | 375/232 |
| 5,867,532 | * 2/1999 | Ito et al. | 375/265 |
| 5,889,759 | * 3/1999 | McGibney | 370/207 |
| 5,914,931 | * 6/1999 | Kang et al. | 370/203 |
| 5,987,063 | * 11/1999 | Rinne | 375/226 |
| 6,009,073 | * 12/1999 | Kaneko | 370/203 |

FOREIGN PATENT DOCUMENTS 09153882   6/1997   (JP) ................................. H04J/11/00

* cited by examiner

*Primary Examiner*—Stephen Chin
*Assistant Examiner*—Paul N Rupert
(74) *Attorney, Agent, or Firm*—Jacobson, Price, Holman & Stern, PLLC

(57) ABSTRACT

Modulated and coded signals sequentially transmitted by orthogonal frequency-division multiplexing transmission are calibrated on the basis of a reference signal to obtain sequential first calibrated signals. Amplitude and phase differences of the sequential first calibrated signals are detected. The sequential first calibrated signals are calibrated on the basis of the amplitude and phase differences to obtain sequential second calibrated signals. The second signals are then decoded to obtain sequential decoded signals.

22 Claims, 7 Drawing Sheets

APPARATUS AND METHOD OF DEMODULATING CODED SIGNAL UNDER OFDM TRANSMISSION

BACKGROUND OF THE INVENTION

The present invention relates to demodulation of digital signals. Furthermore, the invention relates to demodulation of digital signals modulated by a modulation method such as quadrature amplitude modulation (QAM) and transmitted with a plurality of carrier waves by orthogonal frequency-division multiplexing (OFDM).

The OFDM transmission is a frequency-division multiplexing transmitting method to transmit modulated digital data with a plurality of orthogonal carrier waves.

The OFDM transmission is advantageous in that it is useful in multipath transmission, it rarely has an effect on other transmission lines and vise versa, and it provides high frequency usage efficiency. It is thus useful for mobile digital audio and TV broadcasting.

The orthogonal carrier waves are generated by an inverse fast Fourier transform (IFFT) circuit in signal transmission. The carrier waves are separated from each other by a fast Fourier transform (FFT) circuit with Fourier transform in signal reception.

The OFDM transmission is useful for multipath transmission because of a guard interval that is a signal period of time provided per signal to be transmitted to cancel signal interference.

However, QAM requires waveform equalization (signal adjusting) in demodulation. Further, received signal level will tremendously vary due to movement in case of mobile signal reception under multipath environment. Thus, signal compensation more accurate than that in static condition is required.

The higher the travel speed during mobile communications and the greater the difference in received electric field strength under multipath environment, the greater the received signal variation per unit of time. Further, the more multilevel in QAM, the more difficult the modulation becomes.

In order to deal with the signal variation, a reference signal is inserted into a signal to be transmitted per carrier during signal transmission. Then, on signal reception, its amplitude phase variation is extracted to adjust signals coming later.

However, the reference signals are transmitted at a constant period of time. And, hence adjusting values will not be updated until the next reference signal comes.

The received signals that vary in a minute period of time thus cannot be demodulated due to movement during mobile communications or change in environment.

The more reference signals, the higher the possibility of adjusting, however, the less the transmissible data amount. Therefore, in mobile signal reception under OFDM, the more the multilevel becomes in modulation, the more difficult to absorb received signal variation.

SUMMARY OF THE INVENTION

A purpose of the present invention is to provide an apparatus and a method of demodulating a signal modulated by OFDM with accurate signal calibration.

The present invention provides a demodulating apparatus comprising: a calibrator to calibrate modulated and coded signals on the basis of a reference signal to obtain sequential first calibrated signals, the modulated and coded signals having been transmitted sequentially to the demodulating apparatus by orthogonal frequency-division multiplexing transmission; a self-calibrator to detect amplitude and phase differences of the sequential first calibrated signals and calibrate the sequential first signals on the basis of the amplitude an d phase differences to obtain sequential second calibrated signals; and a decoder to decode the second signals to obtain sequential decoded signals.

Further, the present invention provides a demodulating method comprising the steps of: calibrating modulated and coded signals on the basis of a reference signal to obtain sequential first calibrated signals, the modulated and coded signals having been transmitted sequentially by orthogonal frequency-division multiplexing transmission; detecting amplitude and phase differences of the sequential first calibrated signals and calibrate the first signals on the basis of the amplitude and phase differences to obtain sequential second calibrated signals; and decoding the second signals to obtain sequential decoded signals.

DETAILED DESCRIPTION OF THE PREFERRED EMBODIMENTS

Preferred embodiments according to the present invention will be disclosed with reference to the attached drawings.

An apparatus for modulating signals for OFDM transmission will be explained first with reference to FIG. 1. The apparatus will be called an OFDM modulating apparatus hereinafter.

Figure 1:
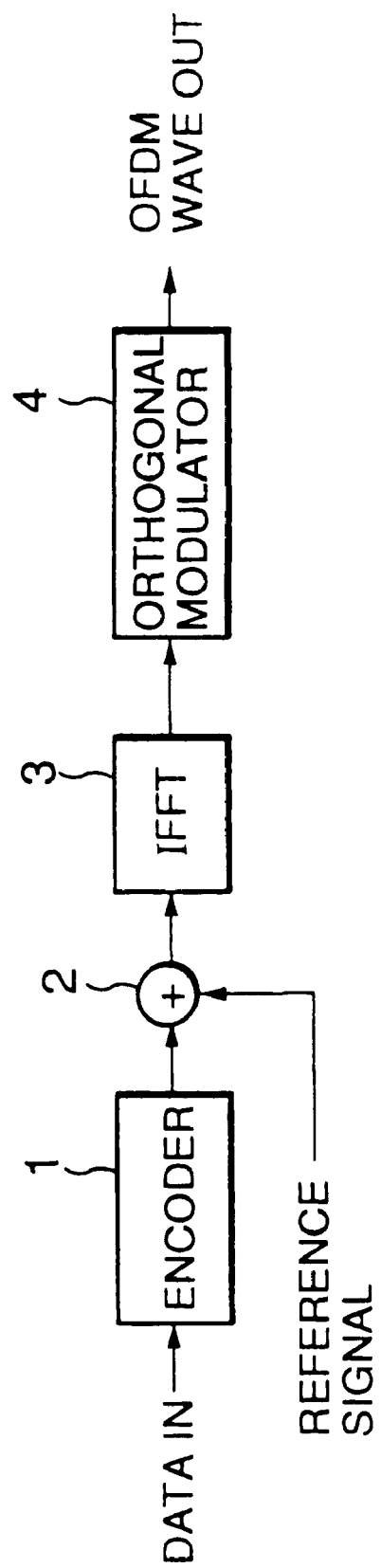
FIG. 1 is a block diagram showing main portions of an OFDM modulating apparatus.

The OFDM modulating apparatus shown in FIG. 1 outputs data to be transmitted with 256 carrier waves. The apparatus employs double-over sampling for easier analog filter design that conducts IFFT calculation of 512 points to generate waves to be transmitted by OFDM transmission. The waves will be called OFDM waves herein after.

The OFDM modulating apparatus employs 256 QAM for modulation of each carrier. Input data is coded by an encoder 1 to apply 8-bit data to one carrier. More in detail, first 4-bit data and second 4-bit data are applied to a real and an imaginary part of each carrier, respectively.

Further, calibration reference data and synchronization data are inserted into one symbol of the carrier in addition to the data bits.

Data frequency allocation to an IFFT calculator 3 is listed as follows in which numbers are assigned to IFFT windows from low to high frequencies.

f0 to f127: Data signals applied to IFFT 3.

f128 to f383: No signal generated with carrier level zero.

f384 to f511: Data signals applied to IFFT 3.

A reference signal is inserted with the coded data into one symbol of a specific carrier by an adder 2. The carrier is then shifted per symbol.

The reference signal of each carrier is transmitted per 256 symbols because 256 carrier waves are employed in the embodiment.

The IFFT calculator 3 to which frequency allocation has been conducted as above outputs I and Q sequential signals. The I and Q signals are applied to an orthogonal modulator 4 that generates OFDM waves.

A first preferred embodiment of an apparatus of demodulating signals transmitted by OFDM transmission according to the present invention will be explained with reference to FIG. 2. This apparatus will be called an OFDM demodulating apparatus hereinafter.

Figure 2:
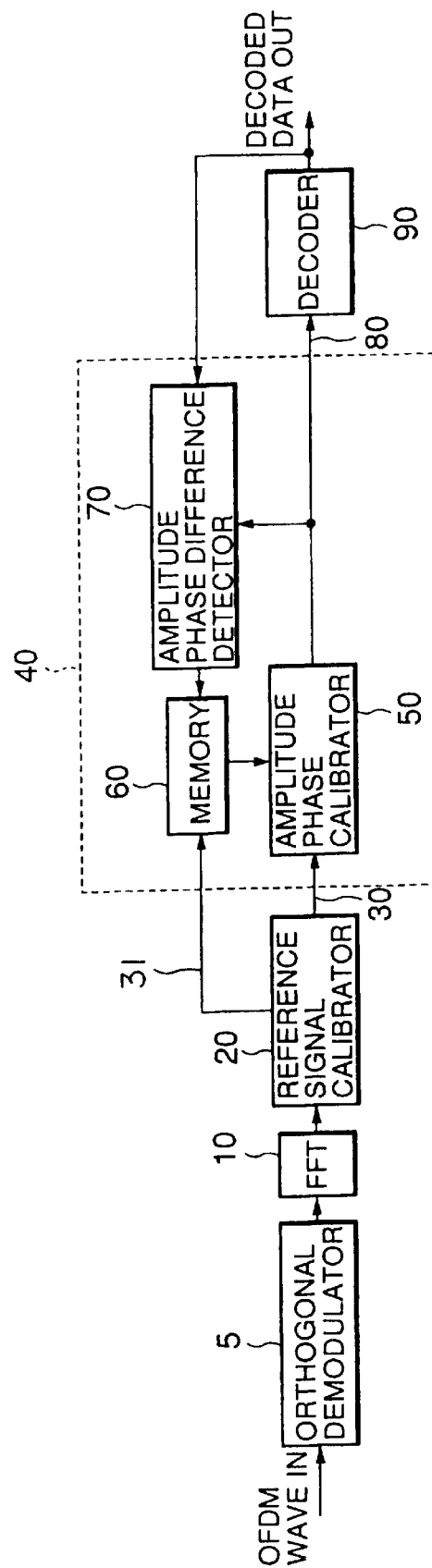
FIG. 2 is a block diagram showing a first embodiment of an OFDM demodulating apparatus according to the present invention.

The OFDM waves generated by the orthogonal modulator 4 of FIG. 1 are applied to an orthogonal demodulator 5 shown in FIG. 2. The demodulated OFDM waves are applied to a FFT calculator 10. The calculation resultants are applied to a reference signal calibrator 20.

The reference signal calibrator 20 detects amplitude and phase variants of the transmitted reference signal of a carrier to obtain calibration values for calibrating the variants. For next symbols, calibration is conducted with the calibration values. The calibration values are updated for each transmitted new reference signal.

The first calibrated signal 30 calibrated and output from the reference signal calibrator 20 is applied to a self-calibrator 40. The self-calibrator 40 is provided with an amplitude phase calibrator 50, a memory 60 and an amplitude phase difference detector 70.

The first calibrated signal 30 is applied to the amplitude phase calibrator 50. Further, a reset signal 31 (which will be described later) generated by the reference signal calibrator 20 is applied to the memory 60.

Amplitude and phase differences of sequential coded data signals stored in the memory 60 are read therefrom and applied to the amplitude phase calibrator 50. On the basis of the amplitude and phase differences, the amplitude phase calibrator 50 calibrates the amplitude and phase of the first calibrated signal 30. The resultant second calibrated signal 80 is applied to the amplitude phase difference detector 70 and a decoder 90.

The amplitude phase difference detector 70 detects amplitude and phase differences between the second calibrated signal 80 and a decoded signal output from the decoder 90. The detected amplitude and phase difference data is applied to the memory 60.

The memory 60 stores the amplitude and phase difference data. The memory 60 is reset by a command (the reset signal 31) from the reference signal calibrator 20 with respect to a carrier for which a reference signal has been transmitted.

The second calibrated signal 80 calibrated and output from the self-calibrator 40 is applied to the decoder 90 in which the signal 80 is subjected to QAM decoding. The resultant decoded data is applied to the amplitude phase difference detector 70.

The signal processing from the reference signal calibrator 20 to the decoder 90 will be explained more in detail.

A new signal point frame is generated by obtaining calibrating values on the basis of reference signals and conducting calibration with the calibrating values. The 256 QAM provides 256 signal point frames. A received signal is located outside a signal point frame will be treated as a different signal, thus causing an error.

The new signal point frame is a reference for next symbols until a new reference signal is transmitted and the calibrating values are updated.

The self-calibration is conducted using amplitude and phase differences between sequentially received signals during a period of time of transmission from a reference signal to the next reference signal. A received signal of the first symbol after a reference signal that has been transmitted is accurately calibrated at a point on the 256 signal point frames by the decoder 90.

The received signal is referred to as a reference signal of the next symbol. That is, the amplitude and phase variants between the present and next symbols' received signals are detected in a time axis by the amplitude phase difference detector 70. The detected variants are then stored in the memory 60.

Further, with respect to the next symbol, the variants are read from the memory 60. And, on the basis of the variants, the amplitude phase calibrator 50 conducts calibration of the next symbol's received signal, that is, generates new signal point frame.

Figure 3:
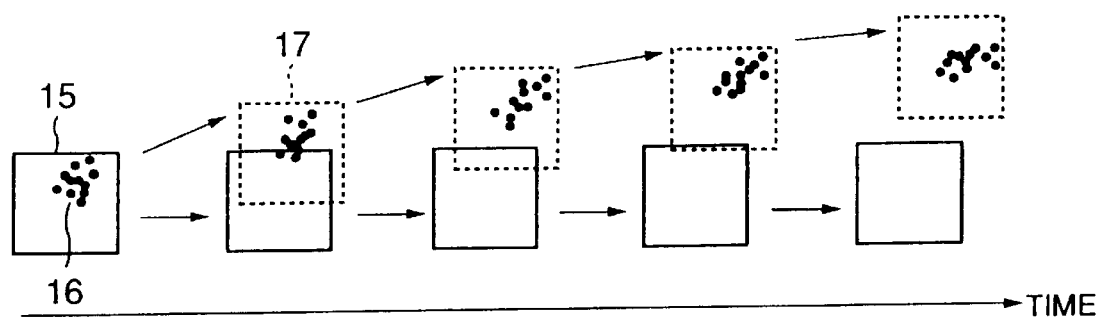
FIG. 3 illustrates generation of signal point frames.

The generation of new signal point frames is explained more in detail with reference to FIG. 3. The principle of signal point generation with reference to FIG. 3 is applied not only to the first embodiment but also to other embodiments which will be described later.

As shown in FIG. 3, a signal point frame 15 of a reference signal remains unchanged without updating until the next reference signal transmission. A received signal 16, on the other hand, varies with time passing during mobile communications. A signal point frame 17 utilizing the signal 16 also varies to follow the signal variation.

The signal point frame variation occurs due to multipass or mobile communications. And, each signal point frame is updated per symbol.

The signal point frame's chase of the signal variation by self-calibration is reset by the next reference signal transmission. Then, the same signal processing is repeated with a reference signal point frame newly generated by reference signal calibration.

As described above, a signal point frame is generated on the basis of the past variants in the self-calibration. Because received signal's variants of the former symbol are employed as calibrating values for generation of a signal point frame.

Therefore, an error will occur when a received signal is located outside a signal point frame due to incapable of responding to rapid change. The rapid change is such as acceleration or deceleration during mobile communications or the great change such as high travel speed and great received electric field difference.

Thus, employed in a second embodiment is higher-order prediction with slope components for calibrating value determination. The higher-order prediction obtains not only the former symbol's calibrating values but also the slant components by means of the past calibrating values. More in detail, the higher-order prediction obtains calibrating values in consideration of a slant of higher-order difference obtained recursively when the number of calibrating values to be used is two or more.

Figure 4:
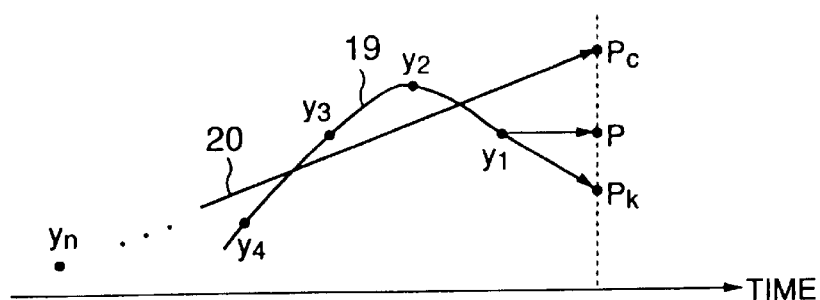
FIG. 4 illustrates higher-order prediction with slant components according to the present invention.

The higher-order prediction will be explained more in detail with reference to FIG. 4.

Suppose n number of calibrating values have already been obtained. A line passing through the calibrating values is expressed as a curve 19 shown in FIG. 4 with the (n-1)th-order polynomial utilizing the Newton's interpolation polynomial.

The calibrating value of the present symbol is expressed as follows:

$$P_k = y_1 - \Delta y_1 + \Delta^2 y_1 + \ldots + (-1)^{n-1} \Delta^{n-1} y_1 \quad (1)$$

$$\begin{pmatrix} \Delta y_i = \Delta y_{i+1} - \Delta y_i \\ \Delta^2 y_i = \Delta y_{i+1} - \Delta y_i \\ \ldots \\ \Delta^n y_i = \Delta^{n-1} y_{i+1} - \Delta^{n-1} y_i \end{pmatrix}$$

The expression (1) allows calibrating value prediction in consideration of slant.

For example, two past calibrating values $y_1$ and $y_2$ provide the calibrating value $P_k$ as a simple expression $P_k = 2y_1 - y_2$. Then, a signal point frame is obtained on the basis of this obtained calibrating value $P_k$.

The calibrating value $y_1$ obtained for the former symbol will be a calibrating value P for generation of the present symbol's signal point frame when the higher-order prediction is not conducted. A signal point frame is then generated on the basis of the calibrating value $y_1$.

The second preferred embodiment of an OFDM demodulating apparatus employing the higher-order prediction with slant components described above will be explained with reference to FIG. 5.

Figure 5:
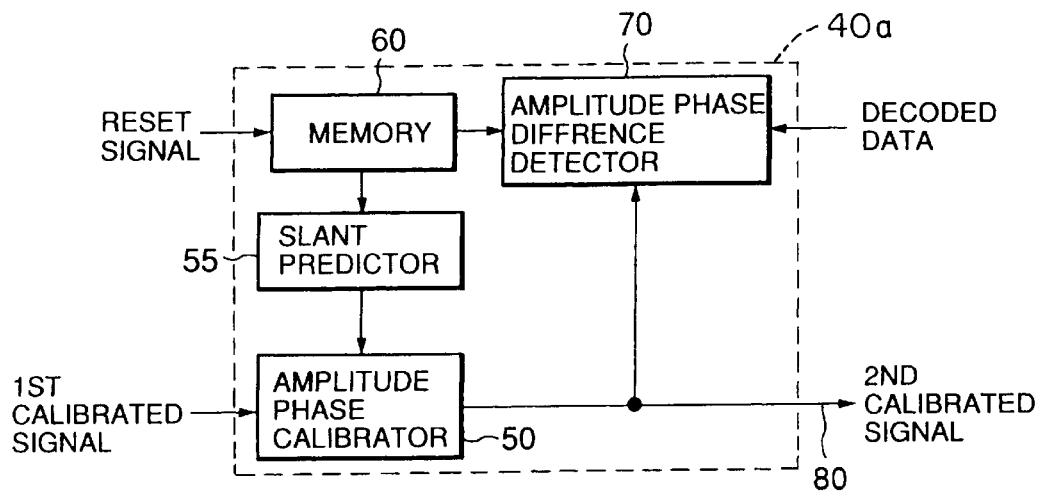
FIG. 5 is a block diagram showing a self-calibrator of a second embodiment of an OFDM demodulating apparatus according to the present invention employing the higher-order prediction with slant components.

The difference between the first and second embodiments is the self-calibrator. And, hence, FIG. 5 shows only a self-calibrator 40a of the second embodiment. In FIG. 5, circuit blocks similar to those previously described with reference to FIG. 2 are denoted by the same reference numerals.

The self-calibrator 40a shown in FIG. 5 is provided with a slant predictor 55 between the memory 60 and the amplitude phase calibrator 50.

Past calibrating values stored in the memory 60 are applied to the slant predictor 55. The predictor 55 predicts change in calibrating value on the basis of the slant components described above. The amplitude phase calibrator 50 calibrates the first calibrated signal 30 applied from the reference signal calibrator 20 of FIG. 2 on the basis of the prediction results from the predictor 55.

The second calibrated signal 80 output from the amplitude phase calibrator 50 is applied to the amplitude phase difference detector 70 and the decoder 90 of FIG. 2; and, the decoded data output from the decoder 90 is supplied to the detector 70 the same as the first embodiment of FIG. 2.

Next, a third preferred embodiment of an OFDM demodulating apparatus employing higher-order prediction with recursive model for determining calibrating values will be explained below.

In the generation of signal point frame in the third embodiment, the recursive model is first obtained by the least square method with not only calibrating values obtained for the former symbol but two or more past calibrating values. Present symbol's calibrating values are then obtained from the recursive model. This recursive model can be expressed as a straight line or a curve of the second-order or more.

Suppose n number of calibrating values $y_1, y_2, y_3, \ldots$ and $y_n$ have already been obtained. The recursive model is expressed as a straight line 20 as shown in FIG. 4 by the least square method.

A calibrating value Pc at the present symbol on the straight line is expressed as follows:

$$P_c = \frac{\sum_{i=1}^{n}(i-\bar{x})(y_i-\bar{y})}{\sum_{i=1}^{n}(i-\bar{x})^2}(-\bar{x}) + \bar{y} \quad (2)$$

$$\begin{pmatrix} \bar{x} = \frac{1+n}{2} \\ \bar{y} = \frac{1}{n}\sum_{i=1}^{n} y_i \end{pmatrix}$$

Signal point frames are obtained on the basis of the calibrating value Pc.

As described above, calibrating value change prediction can be conducted by straight line recursive model as described with reference to FIG. 4 with the expression (2).

The third embodiment employs the least square method. And, this is effective against an error such as white noise.

The third preferred embodiment of an OFDM demodulating apparatus employing the higher-order prediction with straight line recursive model described above will be explained with reference to FIG. 6.

Figure 6:
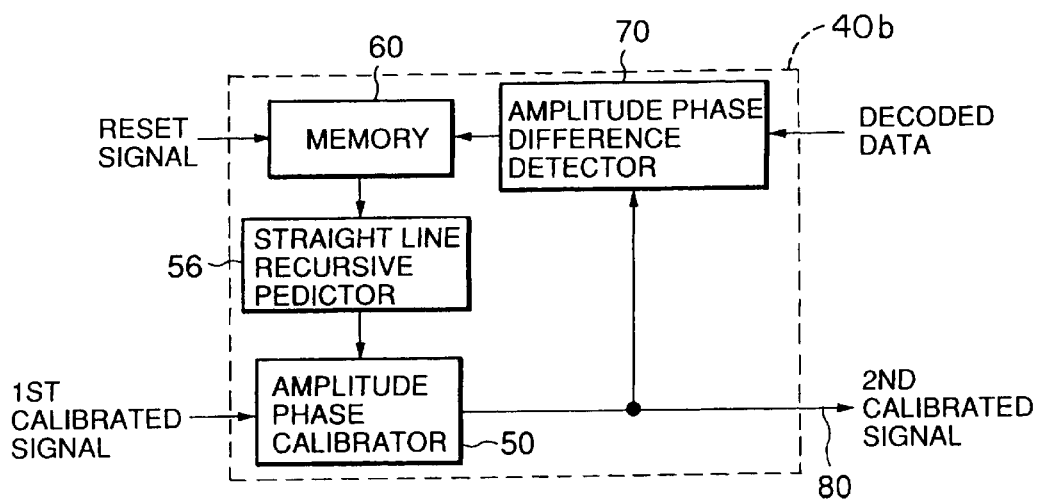
FIG. 6 is a block diagram showing a self-calibrator of a third embodiment of an OFDM demodulating apparatus according to the present invention employing the higher-order prediction with straight line recursive model.

The difference between the first and third embodiments is the self-calibrator. And, hence, FIG. 6 shows only a self-calibrator 40b of the third embodiment. In FIG. 6, circuit blocks similar to those previously described with reference to FIG. 2 are denoted by the same reference numerals.

The self-calibrator 40b shown in FIG. 6 is provided with a straight line recursive predictor 56 between the memory 60 and the amplitude phase calibrator 50.

Past calibrating values stored in the memory 60 are applied to the straight line recursive predictor 56. The predictor 56 predicts change in calibrating value by means of the straight line recursive model described above. The amplitude phase calibrator 50 calibrates the first calibrated signal 30 applied from the reference signal calibrator 20 of FIG. 2 on the basis of the prediction results from the predictor 56.

The second calibrated signal 80 output from the amplitude phase calibrator 50 is applied to the amplitude phase difference detector 70 and the decoder 90 of FIG. 2; and, the decoded data output from the decoder 90 is supplied to the detector 70 the same as the first embodiment of FIG. 2.

In self-calibration, calibrating values are updated for each carrier per symbol, and a new signal point frame is generated on the basis of the updated calibrating values for the signal received next. Calibration with only the calibrating values obtained from the formerly received signal will cause fluctuation or reverse calibration under the environment of low S/N ratio.

In order to overcome this disadvantage, in a fourth preferred embodiment, calibrating values are determined with average in directions of time and frequency axes.

In the time axis direction, calibrating values updated per symbol for each carrier are stored for several numbers. Then, signal point frames area generated on the basis of the average of the stored calibrating values. For the next symbols, the average will be made with replacement of the oldest calibrating values with newly obtained calibrating values.

On the other hand, in the frequency axis direction, signal point frames are generated on the basis of the average of the already determined calibrating values for the carriers close to a carrier for which new calibrating values are to be determined.

The average described above will be further explained with reference to FIG. 7 in which circles represent calibrating values.

A signal point frame will be generated with a calibrating value 18 only for the nth-order carrier when the average will not be made in the time and frequency axes directions.

Figure 7:
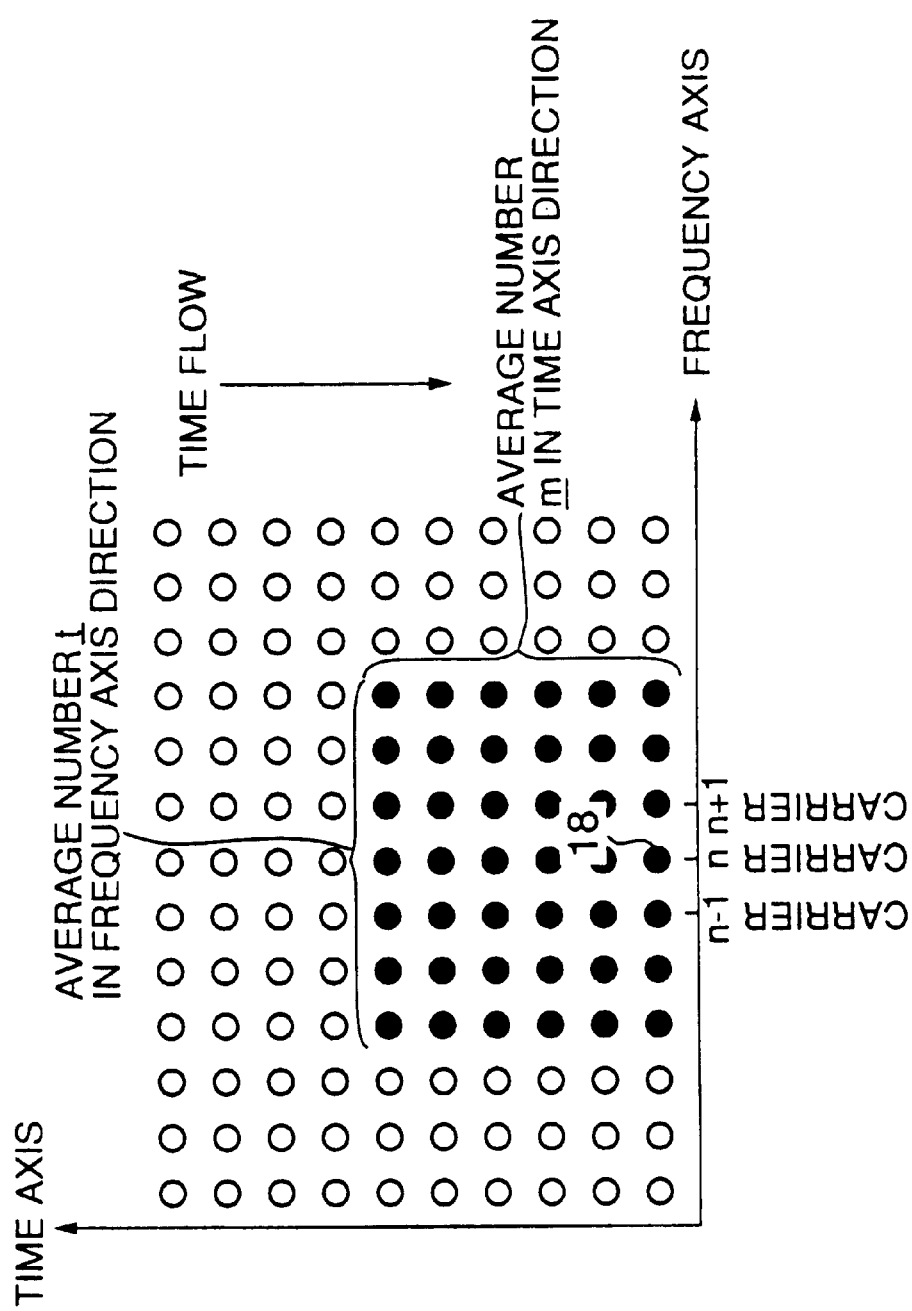
FIG. 7 illustrates averaging conducted in a fourth embodiment.

On the other hand, a signal point frame will be generated with a calibrating value determined by the average of (m×t) number of calibrating values represented by black circles shown in FIG. 7.

The process described above will provide highly reliable calibrating values with less fluctuation.

However, the more the average number m becomes in the time axis direction and the less the average number $t$ becomes in the frequency direction with a constant average total number (m×t), the fourth embodiment will not be able to follow enough fluctuation speed because many past calibrating values are used. However, even if an error occur, recovery will be quick by reference signal transmission because of low average $t$ in the frequency direction.

The fourth preferred embodiment of an OFDM demodulating apparatus with averaging as described above will be explained with reference to FIG. 8.

Figure 8:
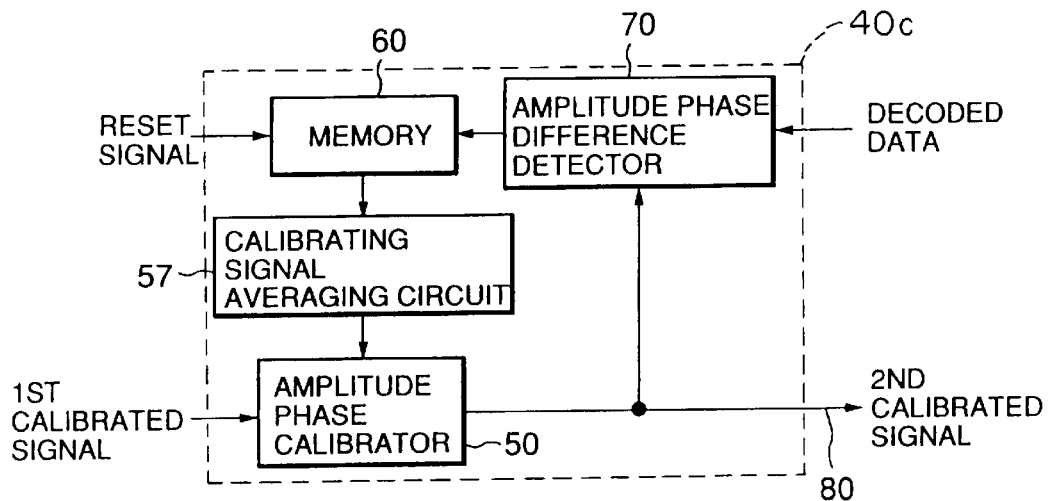
FIG. 8 is a block diagram showing a self-calibrator of a fourth preferred embodiment of an OFDM demodulating apparatus according to the present invention with averaging in time and frequency axis directions.

The difference between the first and fourth embodiments is the self-calibrator. And, hence, FIG. 8 shows only a self-calibrator 40c of the fourth embodiment. In FIG. 8, circuit blocks similar to those previously described with reference to FIG. 2 are denoted by the same reference numerals.

The self-calibrator 40c shown in FIG. 8 is provided with a calibrating signal averaging circuit 57 between the memory 60 and the amplitude phase calibrator 50.

Past calibrating values stored in the memory 60 are applied to the calibrating signal averaging circuit 57. The calibrating signal averaging circuit 57 averages calibrating values in the time and frequency axis directions as described above. The amplitude phase calibrator 50 calibrates the first calibrated signal 30 applied from the reference signal calibrator 20 of FIG. 2 on the basis of the averaged results from the calibrating signal averaging circuit 57.

The second calibrated signal 80 output from the amplitude phase calibrator 50 is applied to the amplitude phase difference detector 70 and the decoder 90 of FIG. 2; and, the decoded data output from the decoder 90 is supplied to the detector 70 the same as the first embodiment of FIG. 2.

Next, a fifth preferred embodiment of an OFDM demodulating apparatus will be explained with reference to FIG. 9.

The difference between the first and fifth embodiments is the self-calibrator. And, hence, FIG. 9 shows only a self-calibrator 40d of the fifth embodiment. In FIG. 9, circuit blocks similar to those previously described with reference to FIG. 2 are denoted by the same reference numerals.

Figure 9:
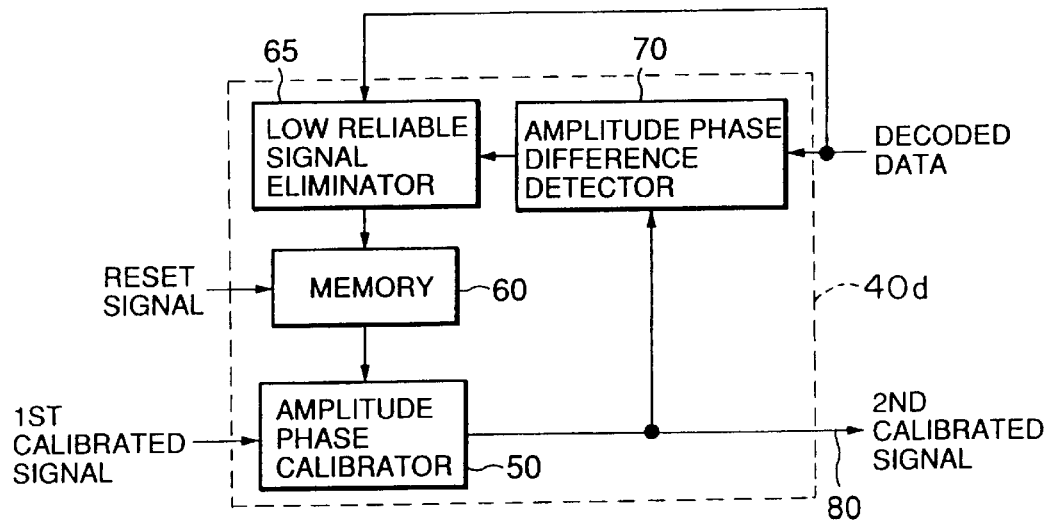
FIG. 9 is a block diagram showing a self-calibrator of a fifth preferred embodiment of an OFDM demodulating apparatus according to the present invention with elimination of low reliable signal.

The self-calibrator 40d shown in FIG. 9 is provided with a signal eliminator 65 between the memory 60 and the amplitude phase detector 70.

The decoded data output from the decoder 90 of FIG. 2 is applied to the amplitude phase detector 70. Also applied to the detector 70 is the second calibrated signal 80 output from the amplitude phase calibrator 50. The detector 70 detects the difference in amplitude and phase between the decoded data and the second calibrated signal.

Amplitude and phase difference data output from the amplitude phase detector 70 is applied to the low reliable signal eliminator 65. The low reliable signal eliminator 65 eliminates amplitude and phase difference data carried by a low reliable signal from the amplitude and phase difference data output from the amplitude phase detector 70. The remaining data is applied to the memory 60.

The low reliable signal is a signal of a low amplitude level compared with a reference signal due to amplitude modulation. Further, the low reliable signal is easily affected by noise. Therefore, data obtained from such signal for calibration of the next symbol's signal becomes unreliable.

The memory 60 stores the remaining data and is reset by the reset signal from the reference signal calibrator 20 of FIG. 2 for the carrier with which the reference signal is transmitted.

The second calibrated signal 80 output from the self-calibrator 40d shown in FIG. 9 is applied to the decoder 90 of FIG. 2. The signal 80 is decoded by the decoder 90 with QAM demodulation and then output therefrom and applied to the amplitude phase detector 70 and also the low reliable signal eliminator 65 of the self-calibrator 40d.

More in detail, the self-calibration updates calibrating values in each carrier per symbol and generates a new signal point frame for the next received signal on the basis of the updated calibrating values. Averaging the already determined calibrating values for the carriers close to a carrier for which new calibrating values are to be determined is conducted in order to have high reliable calibrating values. Then, new calibrating values are determined with elimination of low signal portions if included in the already determined calibrating values.

Figure 10:
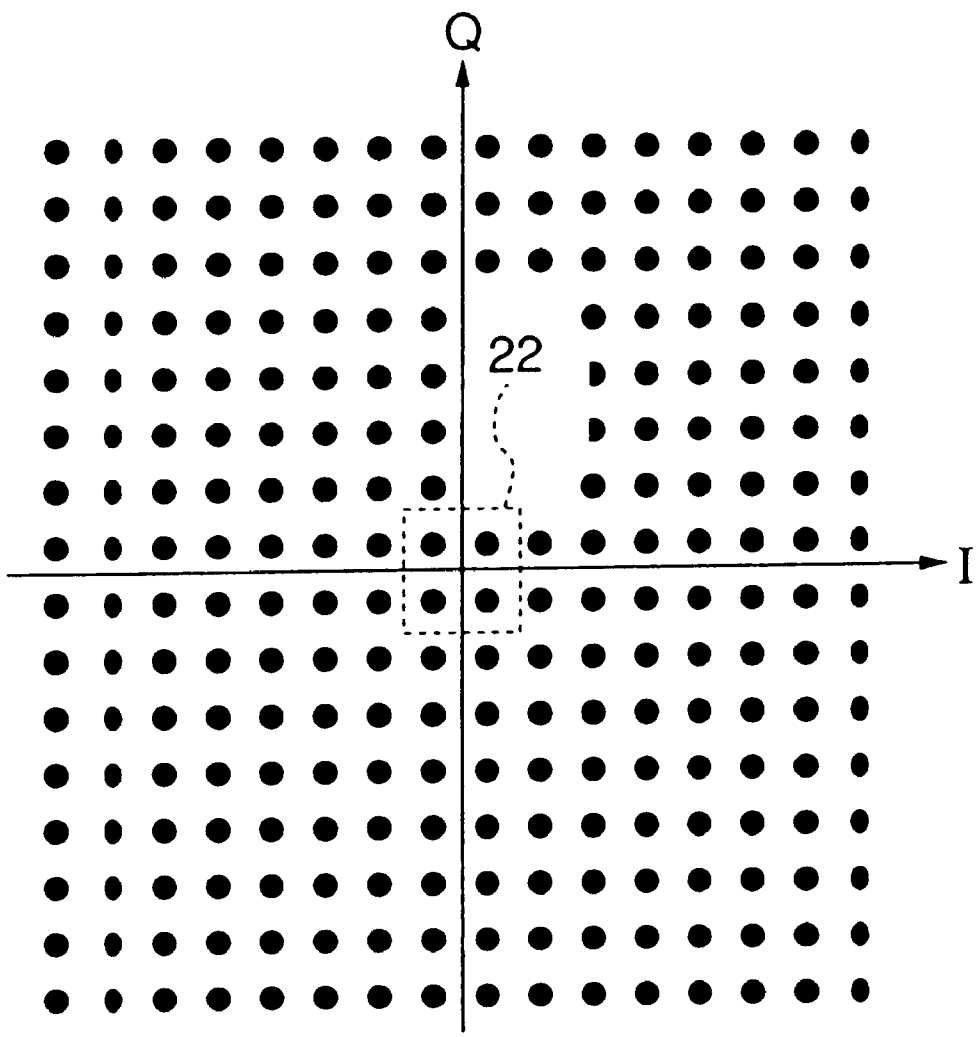
FIG. 10 illustrates a signal point frame.

Furthermore, the self-calibration handles signals of a variety of amplitudes and phases due to utilization of data signals for signal calibration. A low level signal is easily affected by noise than a high level signal when normalization during amplitude and phase detection in self-calibration. Thus, in 256 QAM signal point frame as shown in FIG. 10, if signals decoded by the decoder 90 are the four signals of the minimum level enclosed by a square 22 indicated by a broken line, amplitude and phase portions calculated on the basis of these signals are eliminated by the low reliable signal eliminator 65.

As described above, according to the present invention, self-calibration in addition to reference signal calibration updates calibrating values per transmitted signal to achieve accurate sequential signal calibration.

Further, high-order prediction with slant components, straight line recursive model and averaging achieves accurate signal calibration.

The OFDM demodulating apparatus according to the present invention, therefore, can follow change in transmission line characteristics to achieve accurate signal calibration, thus achieving high reliable communications with less code error. Further, the present invention achieves mobile communications by multilevel modulation with narrow transmitting frequency band because of long symbol time when a transmitting data amount is constant.

What is claimed is:

1. A demodulating apparatus comprising:
   a calibrator to calibrate modulated and coded signals on the basis of a reference signal to obtain sequential first calibrated signals, the modulated and coded signals having been transmitted sequentially to the demodulating apparatus by orthogonal frequency-division multiplexing transmission;
   a self-calibrator to predict calibrating values for the coded signals on the basis of other calibrating values already obtained in a time axis and calibrate the sequential first calibrated signals by means of the predicted calibrating values to obtain sequential second calibrated signals; and
   a decoder to decode the sequential second calibrated signals to obtain sequential decoded signals.

2. The demodulating apparatus according to claim 1, wherein the self-calibrator obtains slant portions between the already obtained calibrating values to predict the calibrating values for the sequential first calibrated signals on the basis of the slant portions.

3. The demodulating apparatus according to claim 1, wherein the self-calibrator obtains a recursive model of the already obtained calibrating values by the least square method to predict the calibrating values for the sequential first calibrated signals on the basis of the recursive model.

4. The demodulating apparatus according to claim 1, further comprising a fast Fourier transformer to process the modulated and coded signals before the signals are calibrated by the calibrator.

5. The demodulating apparatus according to claim 1, wherein the calibrator generates a reset signal that is supplied to the self-calibrator to reset the self-calibrator.

6. A demodulating method comprising the steps of:
   calibrating modulated and coded signals on the basis of a reference signal to obtain sequential first calibrated signals, the modulated and coded signals having been transmitted sequentially by orthogonal frequency-division multiplexing transmission;
   predicting calibrating values for the coded signals on the basis of other calibrating values already obtained in a time axis;
   calibrating the sequential first calibrated signals by means of the calibrated values to obtain sequential second calibrated signals; and
   decoding the sequential second calibrated signals to obtain sequential decoded signals.

7. The demodulating method claim 6 further comprising the step of obtaining slant portions between the already obtained calibrating values to predict the calibrating values for the sequential first calibrated signals by on the basis of the slant portions.

8. The demodulating method according to claim 6 further comprising the step of obtaining a recursive model of the already obtained calibrating values by the least square method to predict the calibrating values for the sequential first calibrated signals by on the basis of the recursive model.

9. The demodulating method according to claim 6, further comprising the step of processing the modulated and coded signals by fast Fourier transform before the signals are calibrated by the calibrator.

10. The demodulating method according to claim 6, further comprising the step of generating a reset signal for resetting the calibration of the sequential first calibrated signals.

11. A demodulating apparatus comprising:
    a calibrator to calibrate modulated and coded signals on the basis of a reference signal to obtain sequential first calibrated signals, the modulated and coded signals having been transmitted sequentially to the demodulating apparatus by orthogonal frequency-division multiplexing transmission;
    a self-calibrator to average other calibrating values already obtained in time and frequency axis directions to obtain an averaged calibrating value and calibrate the sequential first calibrated signals by means of the averaged calibrating value to obtain sequential second calibrated signals; and
    a decoder to decode the sequential second calibrated signals to obtain sequential decoded signals.

12. The demodulating apparatus according to claim 11, further comprising a fast Fourier transformer to process the modulated and coded signals before the signals are calibrated by the calibrator.

13. The demodulating apparatus according to claim 11, wherein the calibrator generates a reset signal that is supplied to the self-calibrator to reset the self-calibrator.

14. A demodulating apparatus comprising:
    a calibrator to calibrate modulated and coded signals on the basis of a reference signal to obtain sequential first calibrated signals, the modulated and coded signals having been transmitted sequentially to the demodulating apparatus by orthogonal frequency-division multiplexing transmission;
    a self-calibrator to detect amplitude and phase differences of the sequential first calibrated signals, eliminate amplitude and phase difference portions of the sequential first calibrated signals if levels thereof are lower than another reference level and calibrate the sequential first calibrated signals on the basis of the amplitude and phase differences from which the amplitude and phase difference portions are eliminated to obtain sequential second calibrated signals; and
    a decoder to decode the sequential second calibrated signals to obtain sequential decoded signals.

15. The demodulating apparatus according to claim 14, further comprising a fast Fourier transformer to process the modulated and coded signals before the signals are calibrated by the calibrator.

16. The demodulating apparatus according to claim 14, wherein the calibrator generates a reset signal that is supplied to the self-calibrator to reset the self-calibrator.

17. A demodulating method comprising the steps of:
    calibrating modulated and coded signals on the basis of a reference signal to obtain sequential first calibrated signals, the modulated and coded signals having been transmitted sequentially by orthogonal frequency-division multiplexing transmission;
    averaging other calibrating values already obtained in time and frequency axis directions to obtain an averaged calibrating value;
    calibrating the sequential first calibrated signals by means of the averaged calibrating value to obtain sequential second calibrated signals; and
    decoding the sequential second calibrated signals to obtain sequential decoded signals.

18. The demodulating method according to claim 17, further comprising the step of processing the modulated and coded signals by fast Fourier transform before the signals are calibrated.

19. The demodulating method according to claim 17, further comprising the step of generating a reset signal for resetting the calibration of the sequential first calibrated signals.

20. A demodulating method comprising the steps of:

calibrating modulated and coded signals on the basis of a reference signal to obtain sequential first calibrated signals, the modulated and coded signals having been transmitted sequentially by orthogonal frequency-division multiplexing transmission;

detecting amplitude and phase differences of the sequential first calibrated signals;

eliminating amplitude and phase difference portions of the sequential first calibrated signals if levels thereof are lower than another reference level;

calibrating the sequential first calibrated signals on the basis of the amplitude and phase differences from which the amplitude and phase difference portions are eliminated to obtain sequential second calibrated signals; and decoding the sequential second calibrated signals to obtain sequential decoded signals.

21. The demodulating method according to claim 20, further comprising the step of processing the modulated and coded signals by fast Fourier transform before the signals are calibrated.

22. The demodulating method according to claim 20, further comprising the step of generating a reset signal for resetting the calibration of the sequential first calibrated signals.

* * * * *